(12) United States Patent
Chiang et al.

(10) Patent No.: US 11,249,377 B2
(45) Date of Patent: Feb. 15, 2022

(54) PROJECTOR

(71) Applicants: BenQ Intelligent Technology (Shanghai) Co., Ltd, Shanghai (CN); BENQ CORPORATION, Taipei (TW)

(72) Inventors: Chin-Fu Chiang, New Taipei (TW); Tung-Chia Chou, New Taipei (TW)

(73) Assignees: BenQ Intelligent Technology (Shanghai) Co., Ltd, Shanghai (CN); BENQ CORPORATION, Taipei (TW)

( * ) Notice: Subject to any disclaimer, the term of this patent is extended or adjusted under 35 U.S.C. 154(b) by 0 days.

(21) Appl. No.: 16/992,072

(22) Filed: Aug. 12, 2020

(65) Prior Publication Data

US 2021/0325767 A1 Oct. 21, 2021

(30) Foreign Application Priority Data

Apr. 15, 2020 (CN) .......................... 202010293365.3

(51) Int. Cl.
*G03B 21/14* (2006.01)
*G02B 27/64* (2006.01)

(52) U.S. Cl.
CPC ......... *G03B 21/142* (2013.01); *G02B 27/646* (2013.01)

(58) Field of Classification Search
CPC ............................ G03B 21/142; G02B 27/646

USPC ........................................................ 353/101
See application file for complete search history.

(56) References Cited

U.S. PATENT DOCUMENTS

2006/0007567 A1\* 1/2006 Sakamoto ................ G02B 7/10
359/822

FOREIGN PATENT DOCUMENTS

JP 2011154307 A \* 8/2011 ............... G02B 7/02
TW I464476 B 12/2014

OTHER PUBLICATIONS

Machine Translation of JP2011154307A (Year: 2021).\*

\* cited by examiner

*Primary Examiner* — Jerry L Brooks
(74) *Attorney, Agent, or Firm* — Winston Hsu

(57) ABSTRACT

A projector includes a lens, a first base, a lock member, a second base and a first fixing member. The lens includes at least one adjusting member. The first base is disposed with respect to the lens. The lock member is disposed on the at least one adjusting member. The second base is disposed with respect to the lock member. When the first fixing member fixes the second base to the first base, the second base pushes the lock member, such that the lock member forces the at least one adjusting member on the lens tightly.

11 Claims, 20 Drawing Sheets

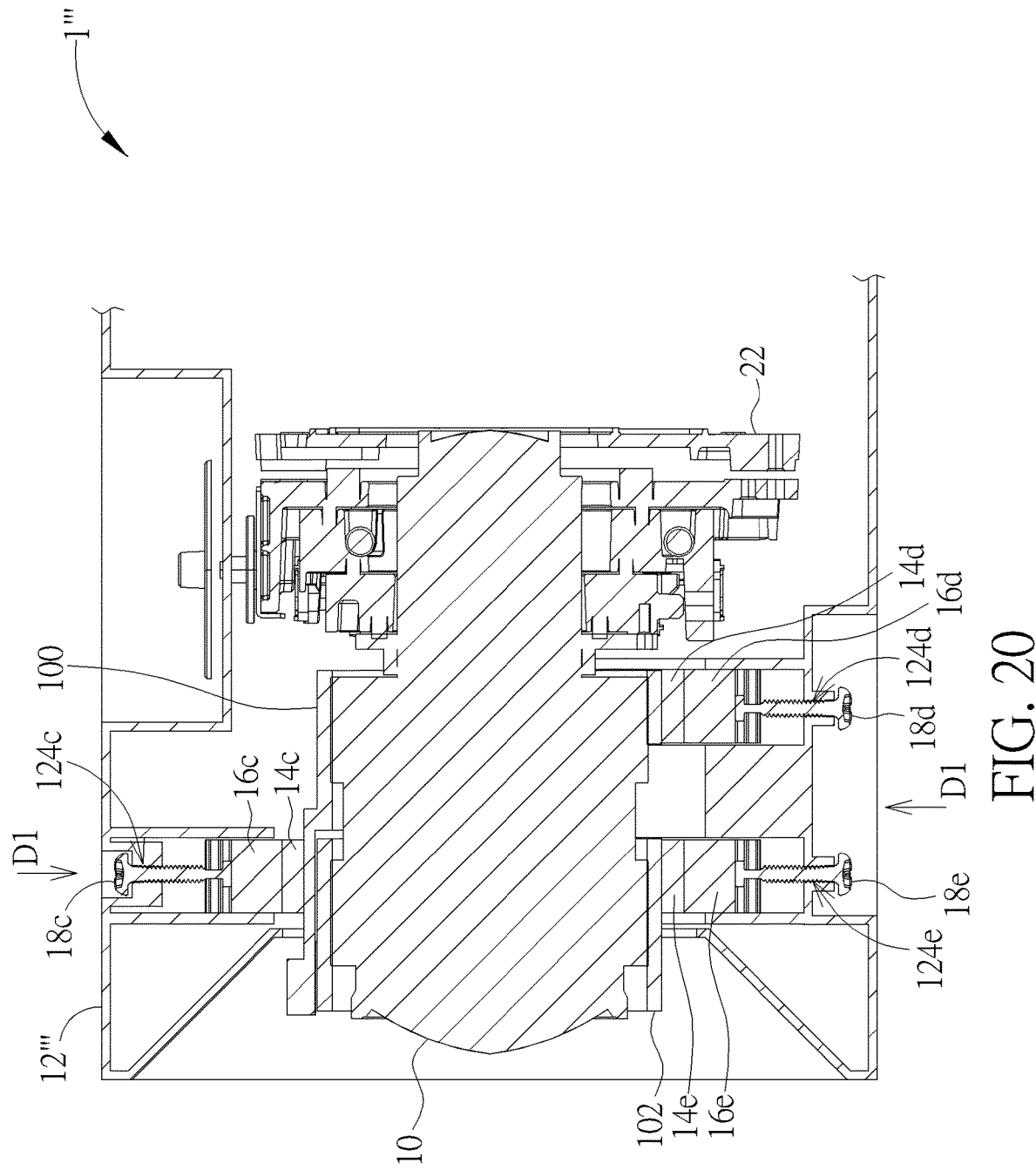

PROJECTOR

BACKGROUND OF THE INVENTION

1. Field of the Invention

The invention relates to a projector and, more particularly, to a projector capable of preventing projection setting from changing due to hit or vibration.

2. Description of the Prior Art

Recently, projectors are getting more and more popular. With the capacity of video playing, projectors are applied not only for common office meetings, but also for various seminars or academic courses. In general, a projector may comprise various optical components including a lens, a light source, an optical engine module and so on, wherein the light source is configured to emit light beam and the light beam is processed by the optical engine module and then projected to form an image through the lens. Accordingly, the lens is an important optical component in the projector. Currently, the lens of the projector is usually equipped with a zoom adjusting ring and a focus adjusting ring for providing zoon adjusting function and focus adjusting function. Furthermore, some projectors are equipped with a displacement adjusting mechanism for adjusting a displacement of the lens. When the projector is being used, a user may have used the aforesaid components to adjust related projection setting in advance (e.g. size, focus and/or position of projected image). However, when the projector is hit, the aforesaid components may shift due to hit, such that the projection setting changes. Furthermore, when the projector is installed at a specific site with vibration, the aforesaid components may also shift due to vibration, such that the projection setting changes.

SUMMARY OF THE INVENTION

The invention provides a projector capable of preventing projection setting from changing due to hit or vibration, so as to solve the aforesaid problems.

According to an embodiment of the invention, a projector comprises a lens, a first base, a lock member, a second base and a first fixing member. The lens comprises at least one adjusting member. The first base is disposed with respect to the lens. The lock member is disposed on the at least one adjusting member. The second base is disposed with respect to the lock member. When the first fixing member fixes the second base to the first base, the second base pushes the lock member, such that the lock member forces the at least one adjusting member on the lens tightly.

According to another embodiment of the invention, the projector may further comprise a casing, a displacement adjusting mechanism and a second fixing member. The lens is disposed in the casing. The displacement adjusting mechanism is disposed in the casing and the lens is connected to the displacement adjusting mechanism. The second fixing member fixes the second base to the casing.

As mentioned in the above, the invention forces the adjusting member (e.g. zoom adjusting ring and/or focus adjusting ring) on the lens tightly by the cooperation between the first base, the lock member, the second base and the first fixing member. Thus, the adjusting member will not shift due to hit or vibration, such that the projection setting (i.e. size and/or focus of projected image) will not change. Furthermore, when the projector is equipped with the displacement adjusting mechanism for the lens, the invention may further use the second fixing member to fix the second base to the casing. In another embodiment, when the first base is the casing of the projector, the invention may force the adjusting member on the lens tightly and fix the lens at the same time by the cooperation between the first base, the lock member, the second base and the first fixing member. Accordingly, the lens will not shift due to hit or vibration, such that the projection setting (i.e. position of projected image) will not change.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 20 is a sectional view illustrating the projector shown in FIG. 16.

DETAILED DESCRIPTION

Figure 1:
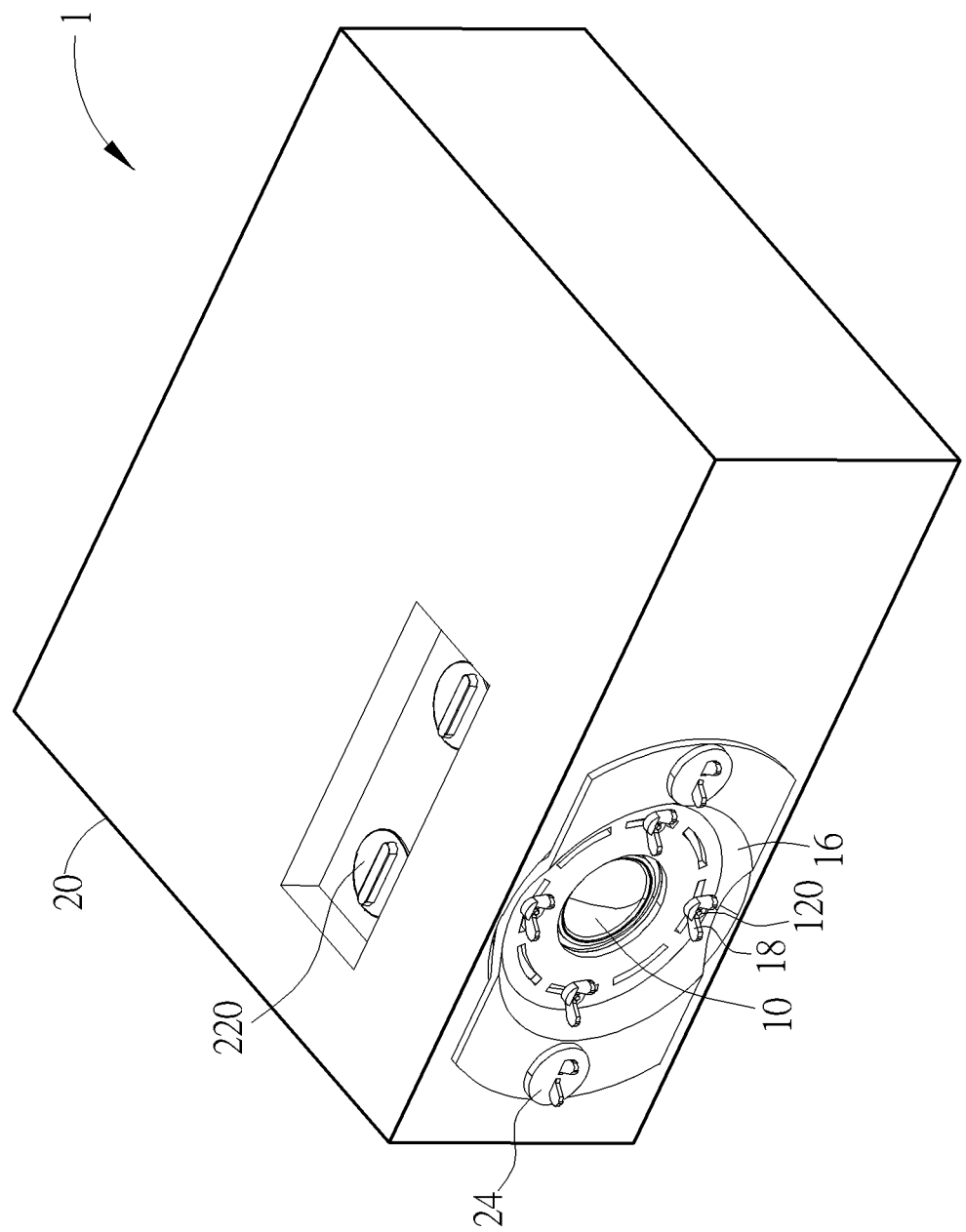
FIG. 1 is a perspective view illustrating a projector according to an embodiment of the invention.
Figure 2:
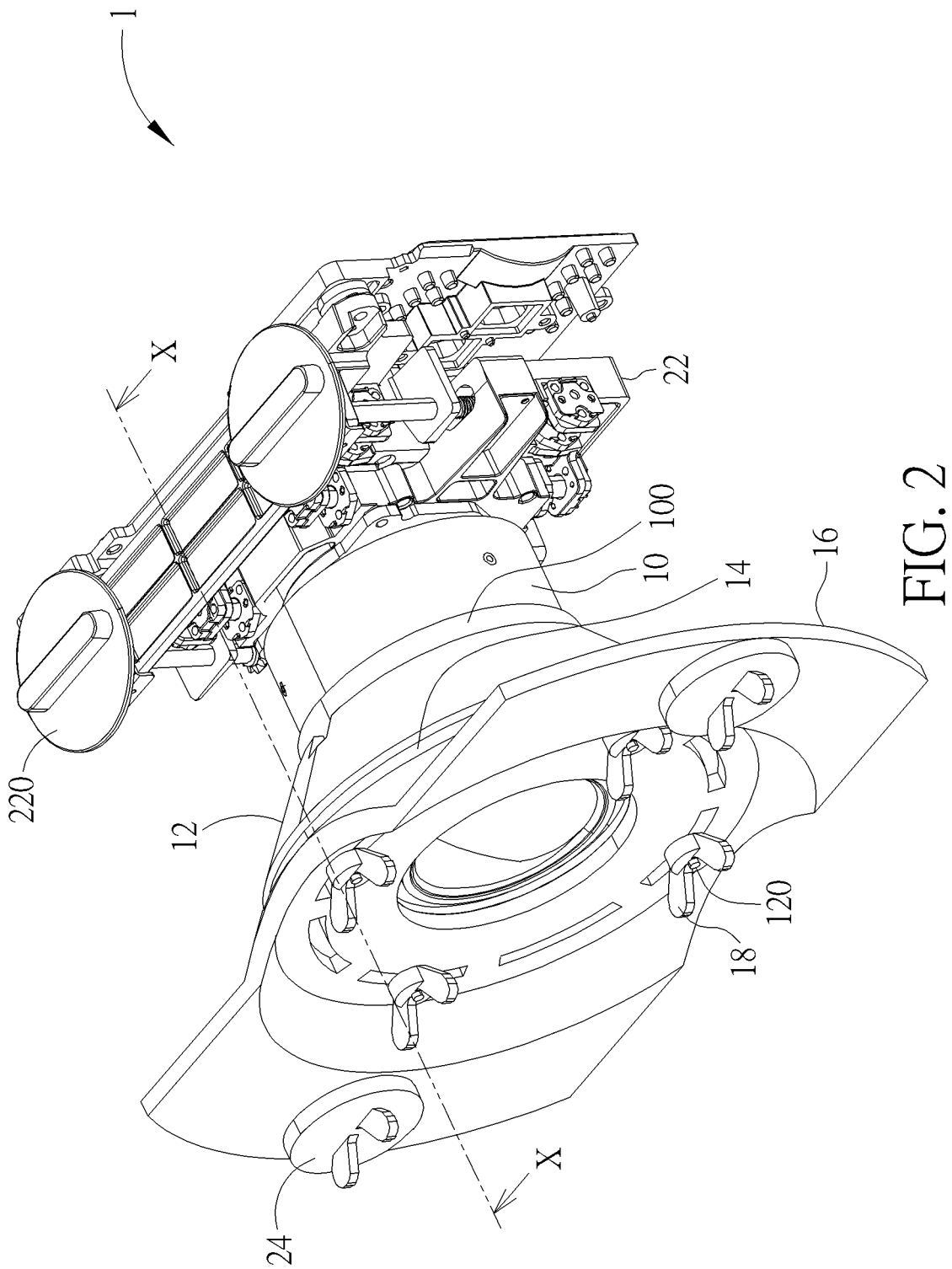
FIG. 2 is a perspective view illustrating internal components of the projector shown in FIG. 1.
Figure 3:
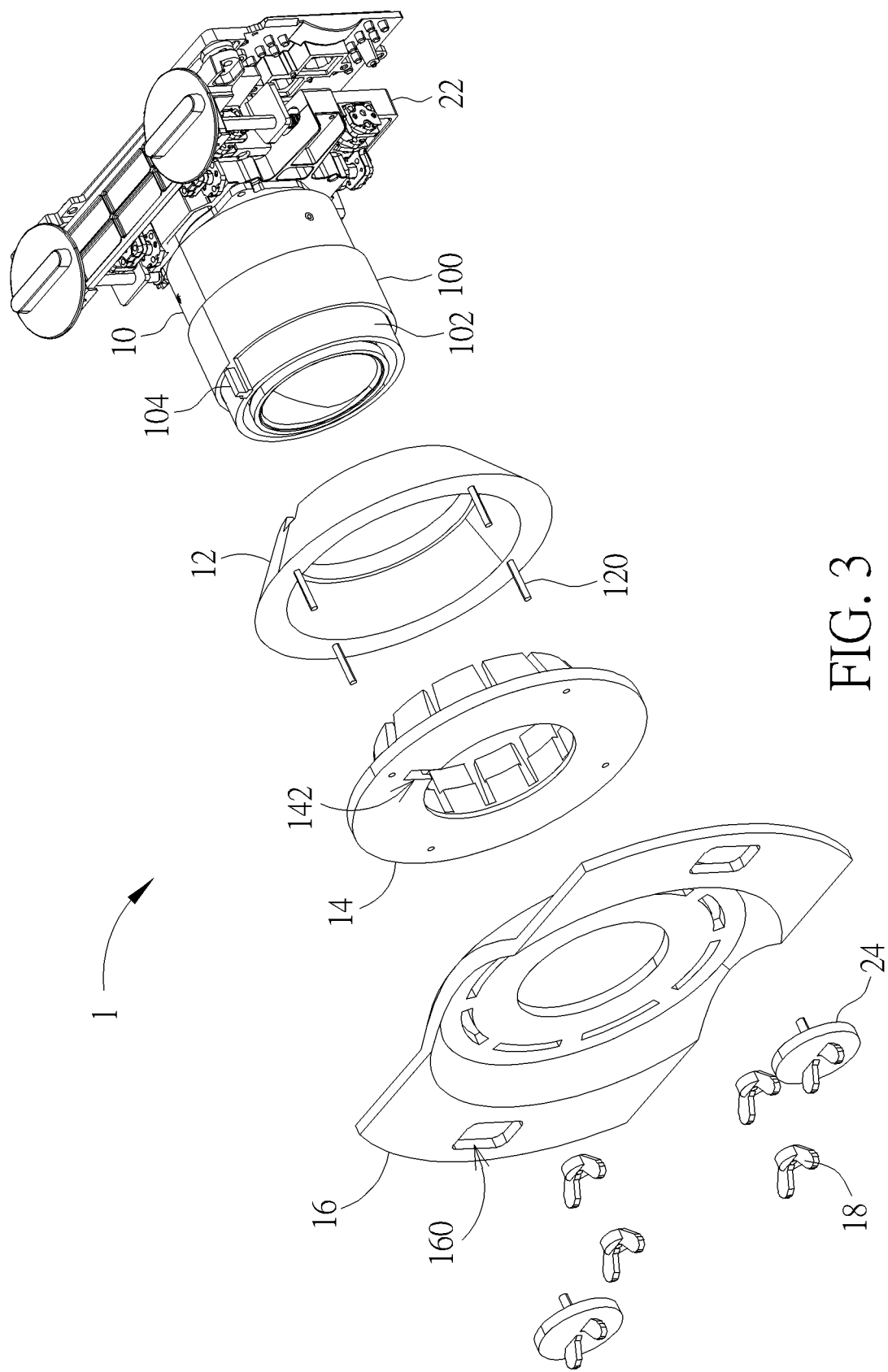
FIG. 3 is an exploded view illustrating the components shown in FIG. 2.
Figure 4:
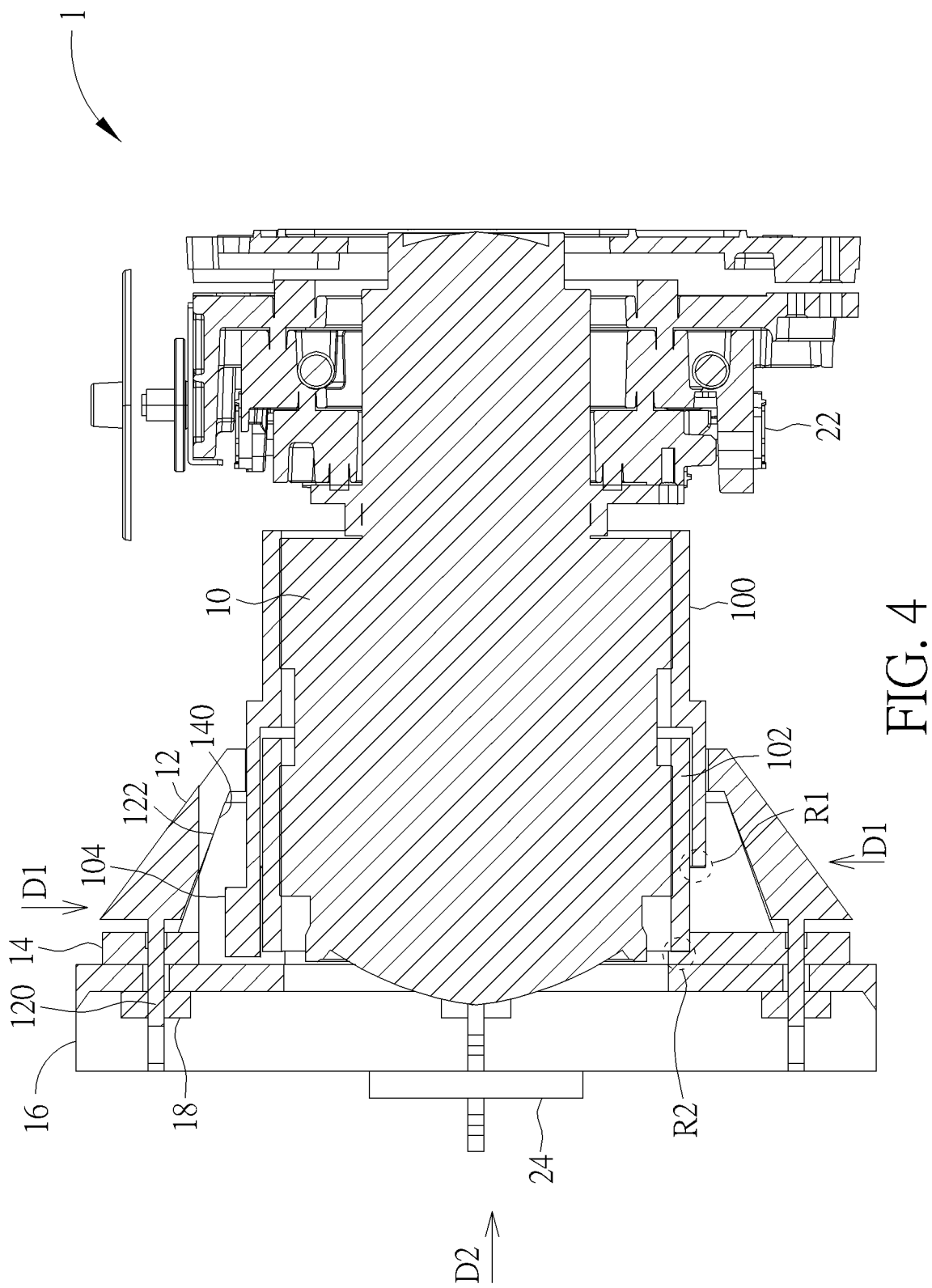
FIG. 4 is a sectional view illustrating the components shown in FIG. 2.
Figure 5:
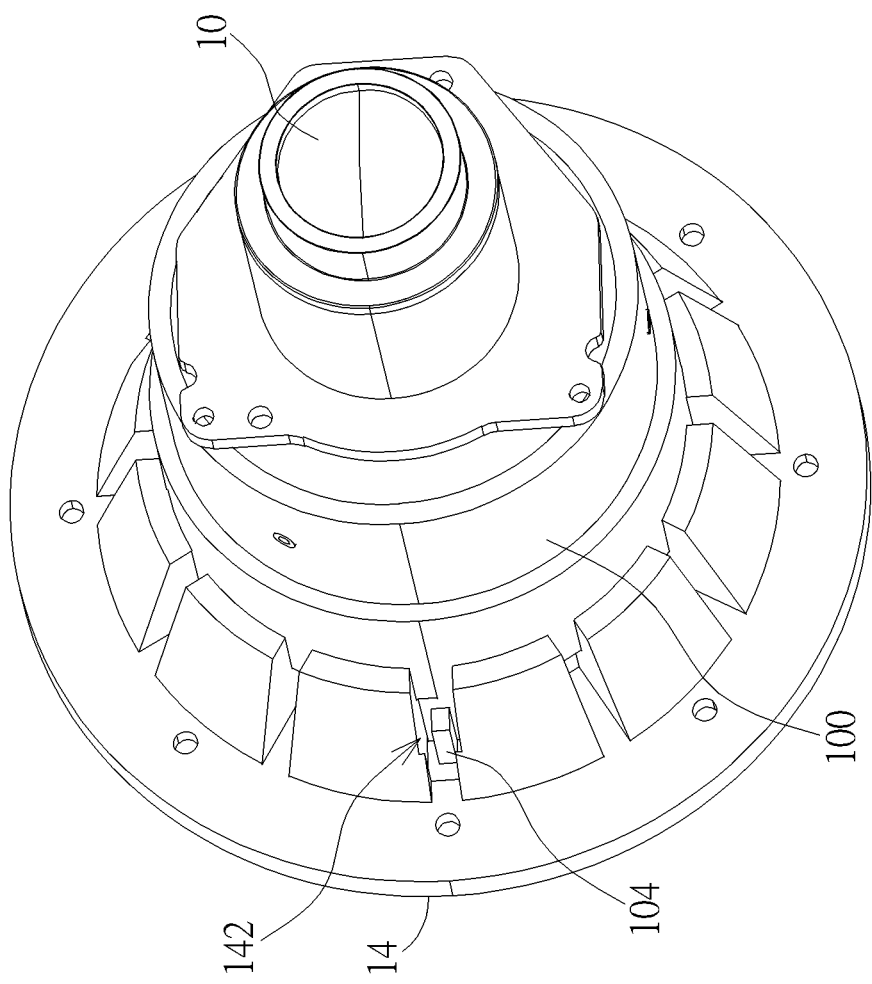
FIG. 5 is a perspective view illustrating the lock member shown in FIG. 3 being disposed on the adjusting member from another viewing angle.
Figure 6:
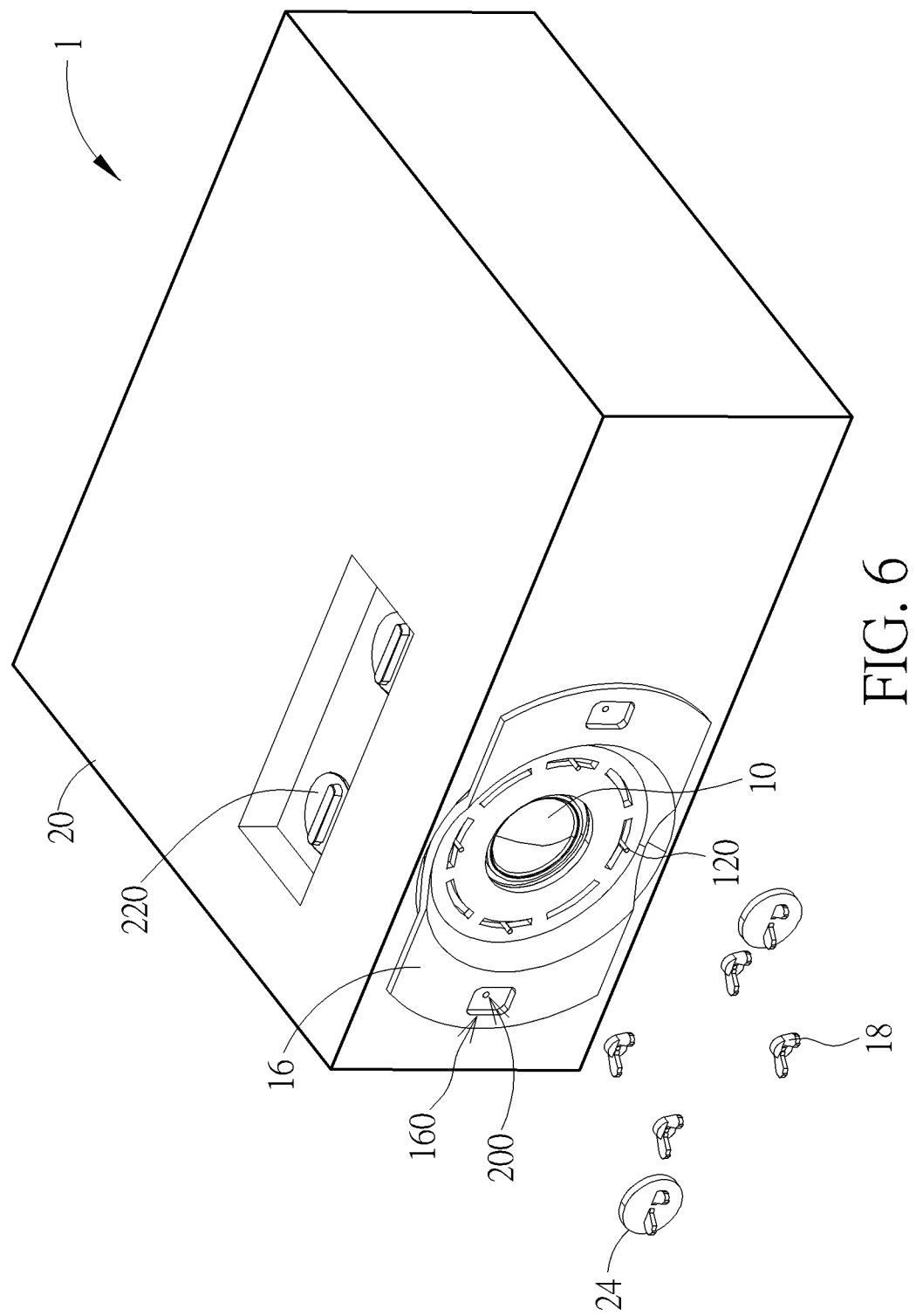
FIG. 6 is a perspective view illustrating the first fixing member and the second fixing member shown in FIG. 1 being detached.

Referring to FIGS. 1 to 6, FIG. 1 is a perspective view illustrating a projector 1 according to an embodiment of the invention, FIG. 2 is a perspective view illustrating internal components of the projector 1 shown in FIG. 1, FIG. 3 is an exploded view illustrating the components shown in FIG. 2, FIG. 4 is a sectional view illustrating the components along line X-X shown in FIG. 2, FIG. 5 is a perspective view illustrating the lock member 14 shown in FIG. 3 being disposed on the adjusting member 100 from another viewing angle, and FIG. 6 is a perspective view illustrating the first fixing member 18 and the second fixing member 24 shown in FIG. 1 being detached.

As shown in FIGS. 1 to 4, the projector 1 comprises a lens 10, a first base 12, a lock member 14, a second base 16, a first fixing member 18, a casing 20, a displacement adjusting mechanism 22 and a second fixing member 24. In this embodiment, the projector 1 may comprise four first fixing members 18 and two second fixing members 24, but is not so limited. It should be noted that the number of the first fixing members 18 and the second fixing members 24 may be determined according to practical applications. In general, the projector 1 may be further equipped with some necessary hardware or software components for specific purposes, such as light source, optical engine, controller, memory, power supply, applications, communication module, etc., and it depends on practical applications.

The lens 10 comprises at least one adjusting member. In this embodiment, the lens 10 may comprise two adjusting members 100, 102, as shown in FIGS. 3 and 4. For example, the adjusting 100 may be, but not limited to, a zoom adjusting ring and the adjusting member 102 may be, but not limited to, a focus adjusting ring. The zoom adjusting ring may rotate with respect to the lens to adjust a size of a projected image and the focus adjusting ring may rotate with respect to the lens to adjust a focus of the projected image. In another embodiment, the lens 10 may only comprise the adjusting member 100 or the adjusting member 102 according to practical applications. Furthermore, the lens 10 and the displacement adjusting mechanism 22 are disposed in the casing 20 and the lens 10 is connected to the displacement adjusting mechanism 22. The displacement adjusting mechanism 22 may comprise two knobs 220 exposed from the casing 20, such that a user may operate the knobs 220 to adjust a displacement of the lens (i.e. adjust a position of the projected image). It should be noted that the configuration and principle of the displacement adjusting mechanism 22 are well known by one skilled in the art, so the explanation will not be depicted herein.

The first base 12 is disposed with respect to the lens 10, the lock member 14 is disposed on the adjusting members 100, 102, and the second base 16 is disposed with respect to the lock member 14. In this embodiment, the first base 12 is disposed on the lens 10 and the lock member 14 is sandwiched in between the first base 12 and the second base 16. In this embodiment, the first base 12 and the lock member 14 may be ring-shaped and sleeved on the lens 10. When the lock member 14 is disposed on the adjusting members 100, 102, the lock member 14 abuts against the adjusting members 100, 102 towards a radial direction D1 of the lens 10, as shown in FIG. 4. In this embodiment, the first base 12 may have a plurality of studs 120 and the first fixing member 18 may be a nut. In another embodiment, the stud 120 may also be replaced by a threaded hole and the first fixing member 18 may also be a screw.

After the first base 12, the lock member 14, the second base 16 and the lens 10 are assembled, the stud 120 of the first base 12 passes through the lock member 14 and the second base 16 to be exposed from the casing 20, as shown in FIG. 6. At this time, the first fixing member 18 may be fixed on the stud 120 to fix the second base 16 to the first base 12. When the first fixing member 18 fixes the second base 16 to the first base 12, the second base 16 pushes the lock member 14, such that the lock member 14 forces the adjusting members 100, 102 on the lens 10 tightly.

As shown in FIG. 4, an inner side of the first base 12 may have a first inclined surface 122 and an outer side of the lock member 14 may have a second inclined surface 140. When the lock member 14 is sandwiched in between the first base 12 and the second base 16, the first inclined surface 122 of the first base 12 is opposite to the second inclined surface 140 of the lock member 14. Accordingly, when the first fixing member 18 fixes the second base 16 to the first base 12, the second base 16 pushes the lock member 14 towards the first base 12. At this time, the second inclined surface 140 of the lock member 14 is forced by the first inclined surface 122 of the first base 12, such that the lock member 14 forces the adjusting members 100, 102 on the lens 10 tightly towards the radial direction D1 of the lens 10. In this embodiment, the lock member 14 may be an elastic body, such as rubber, foam, sponge or other elastic components. Thus, the lock member 14 is forced by the first base 12 to deform elastically, so as to force the adjusting members 100, 102 on the lens 10 tightly. Accordingly, the adjusting members 100, 102 will not shift due to hit or vibration, such that the projection setting (i.e. size and/or focus of projected image) will not change.

In this embodiment, the lock member 14 may further abut against the adjusting members 100, 102 towards an axial direction D2 of the lens 10, as regions R1, R2 shown in FIG. 4. Therefore, when the first fixing member 18 fixes the second base 16 to the first base 12, the second base 16 pushes the lock member 14 towards the axial direction D2 of the lens 10, such that the lock member 14 forces the adjusting members 100, 102 on the lens 10 tightly towards the axial direction D2 of the lens 10. Accordingly, the adjusting members 100, 102 may be forced on the lens 10 more tightly and stably to prevent the adjusting members 100, 102 from shifting due to hit or vibration.

Furthermore, as shown in FIG. 5, the adjusting member 100 may have a first restraining structure 104 and the lock member 14 may have a second restraining structure 142. In this embodiment, the first restraining structure 104 may be a protruding portion (e.g. push lever) on the adjusting member 100 and the second restraining structure 142 may be a recess corresponding to the first restraining structure 104. In another embodiment, the first restraining structure 104 may also be a recess and the second restraining structure 142 may also be a protruding portion corresponding to the first restraining structure 104 When the lock member 14 is disposed on the adjusting member 100, the second restraining structure 142 cooperates with the first restraining structure 104 to restrain the adjusting member 100 from moving (as shown in FIG. 5), such that the adjusting member 100 cannot rotate with respect to the lock member 14.

As shown in FIG. 6, the casing 20 may have a fixing hole 200 and the second base 16 may have an opening 160. In this embodiment, the casing 20 may have two fixing holes 200 and the second base 16 may have two openings 160, but is not so limited. It should be noted that the number of the fixing holes 200 and the openings 160 may be determined according to practical applications. The opening 160 of the second base 16 is larger than the fixing hole 200 of the casing 20. Thus, when the second base 16 is disposed on the lens 10 and the user operates the displacement adjusting mechanism 22 to adjust the displacement of the lens 10, the fixing hole 200 is still exposed within the opening 160 without being covered by the second base 16. After adjusting the displacement of the lens 10, the user may use the second fixing member 24 to fix the second base 16 to the casing 20. For further explanation, the second fixing member 24 passes through the opening 160 of the second base 16 and is fixed to the fixing hole 200 of the casing 20 to fix the second base 16 to the casing 20. Accordingly, the lens 10 will not shift due to hit or vibration, such that the projection setting (i.e. position of projected image) will not change.

Figure 7:
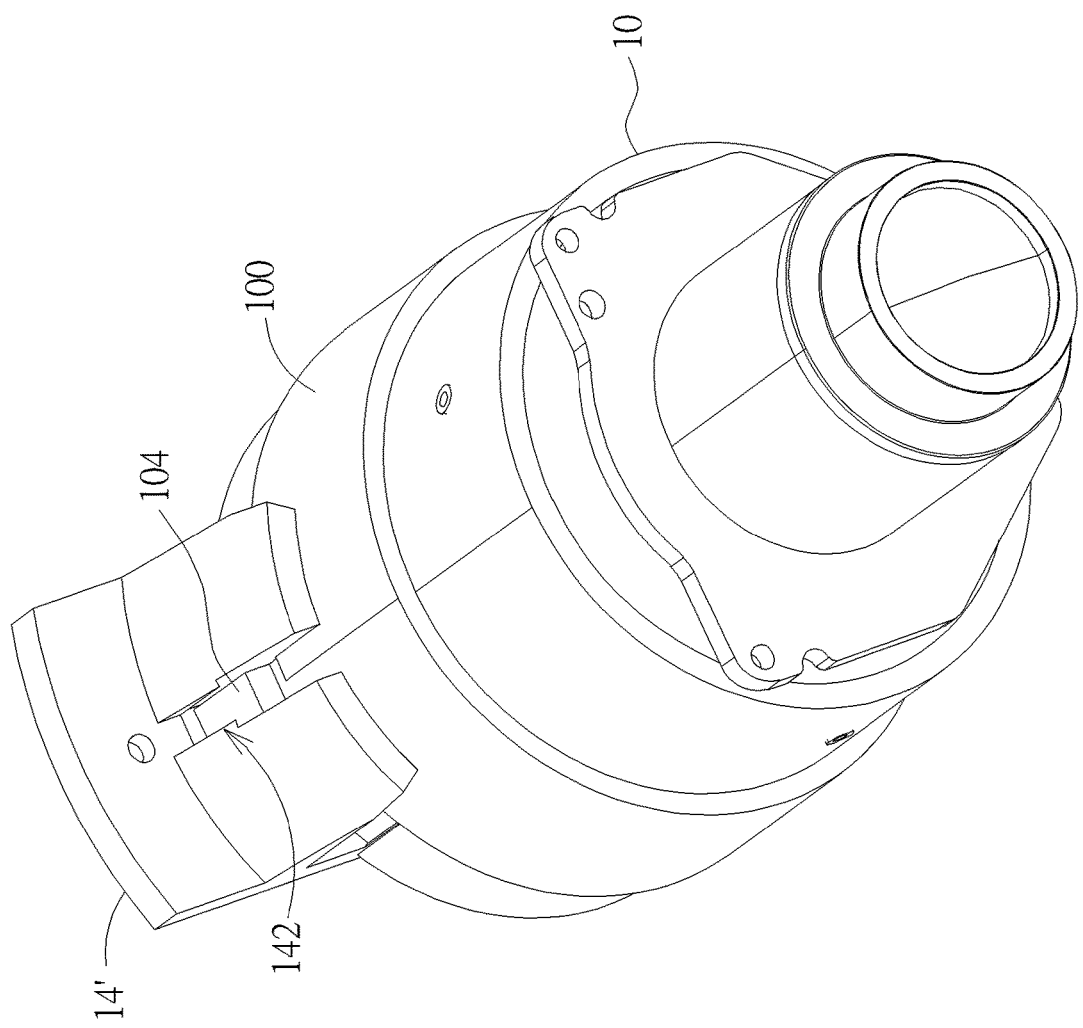
FIG. 7 is a perspective view illustrating a lock member disposed on the adjusting member 100 according to another embodiment of the invention.

Referring to FIG. 7, FIG. 7 is a perspective view illustrating a lock member 14' disposed on the adjusting member 100 according to another embodiment of the invention. The main difference between the lock member 14' and the aforesaid lock member 14 is that the lock member 14' is a partial segment of the lock member 14 rather than ring-shape. In other words, the invention may determine the size of the lock member according to practical applications.

Figure 8:
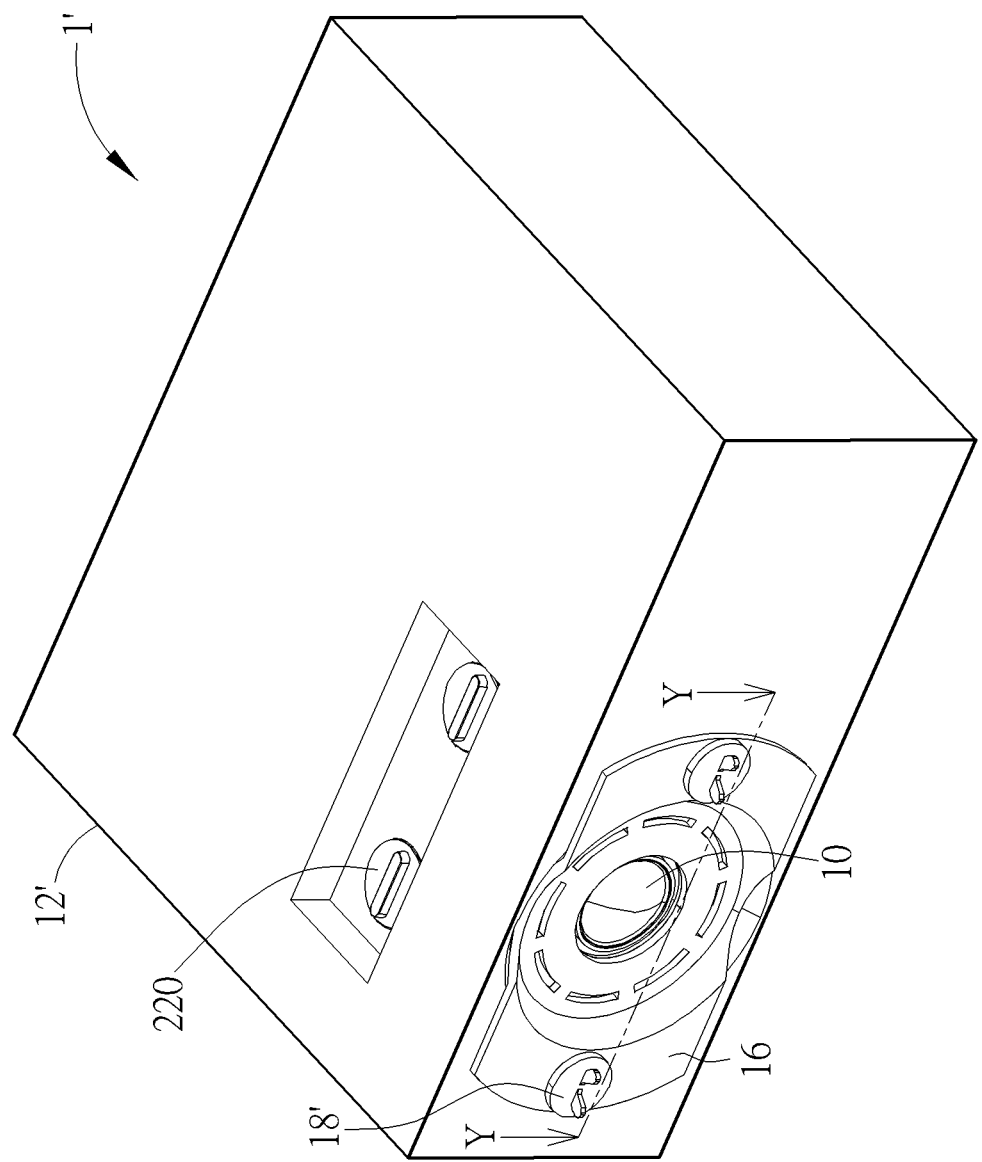
FIG. 8 is a perspective view illustrating a projector according to another embodiment of the invention.
Figure 9:
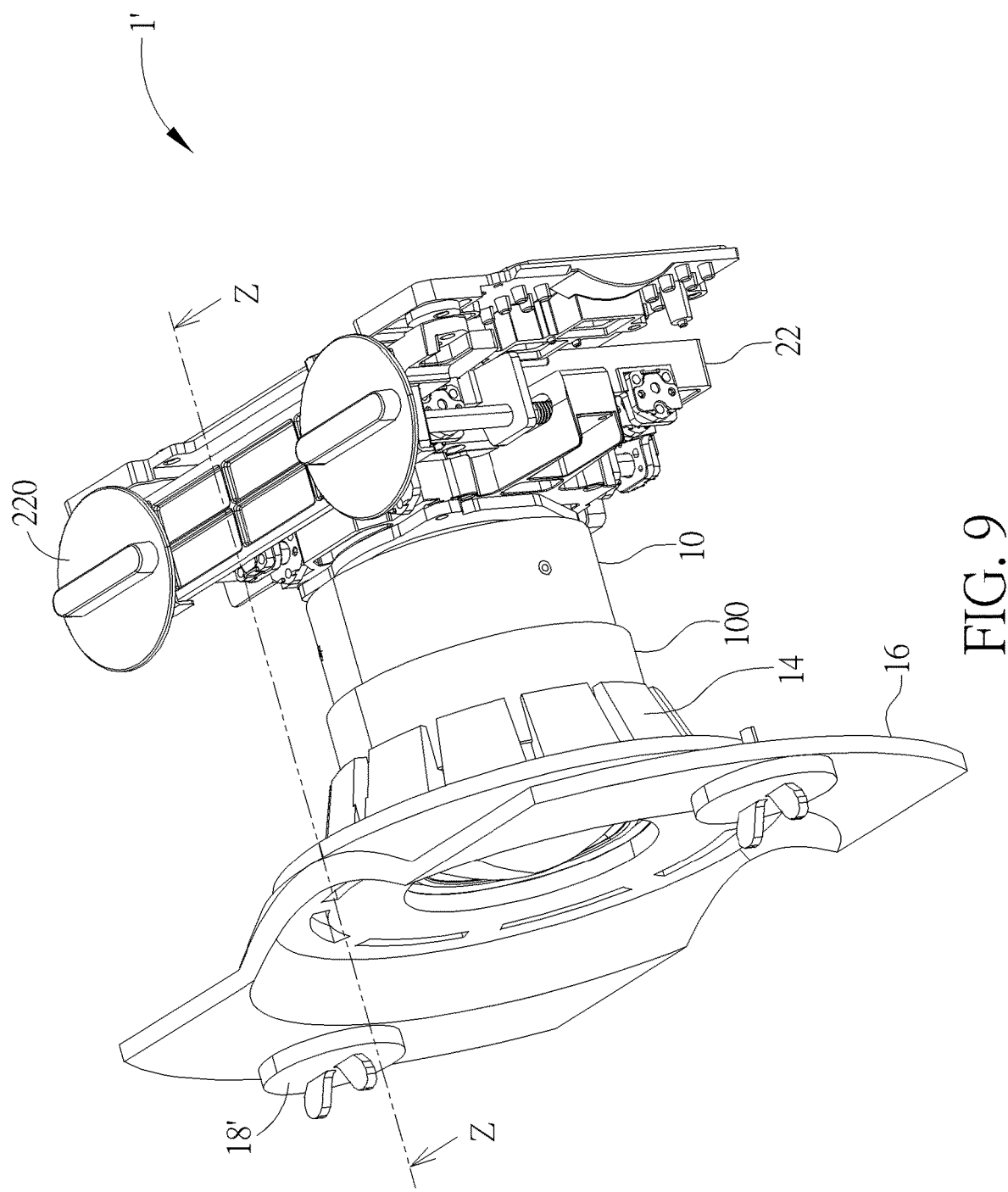
FIG. 9 is a perspective view illustrating internal components of the projector shown in FIG. 8.
Figure 10:
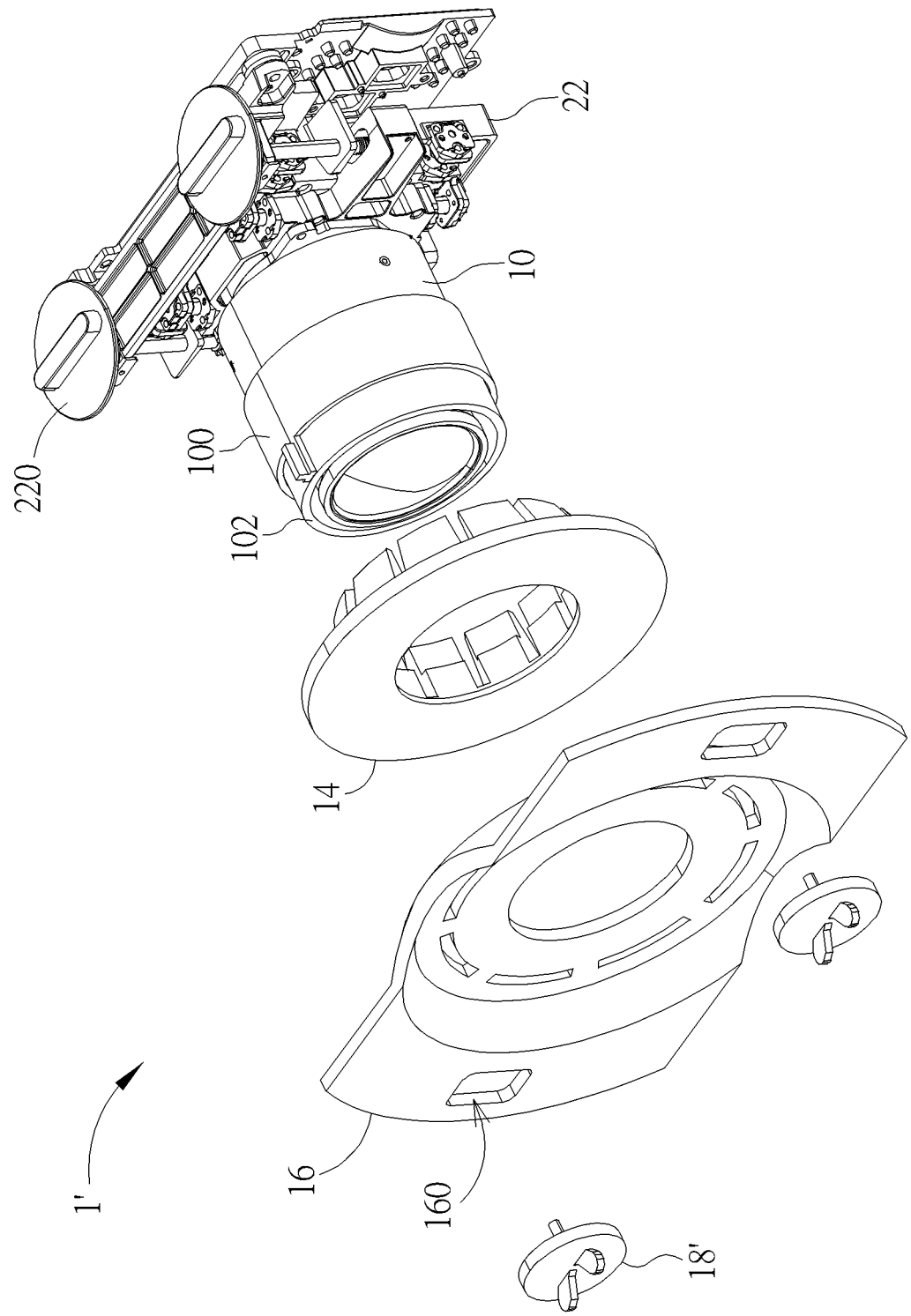
FIG. 10 is an exploded view illustrating the components shown in FIG. 9.
Figure 11:
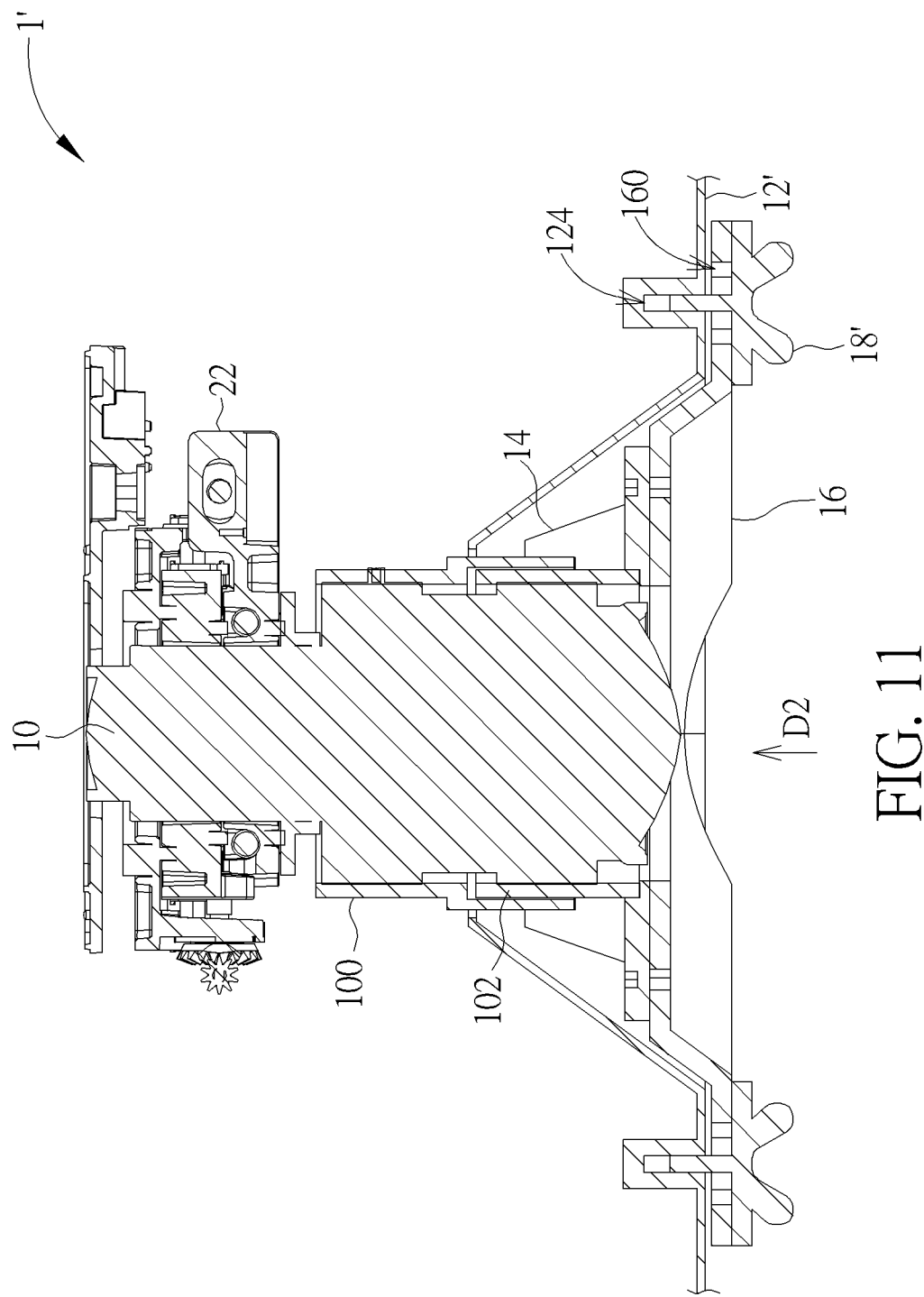
FIG. 11 is a sectional view illustrating the projector shown in FIG. 8.
Figure 12:
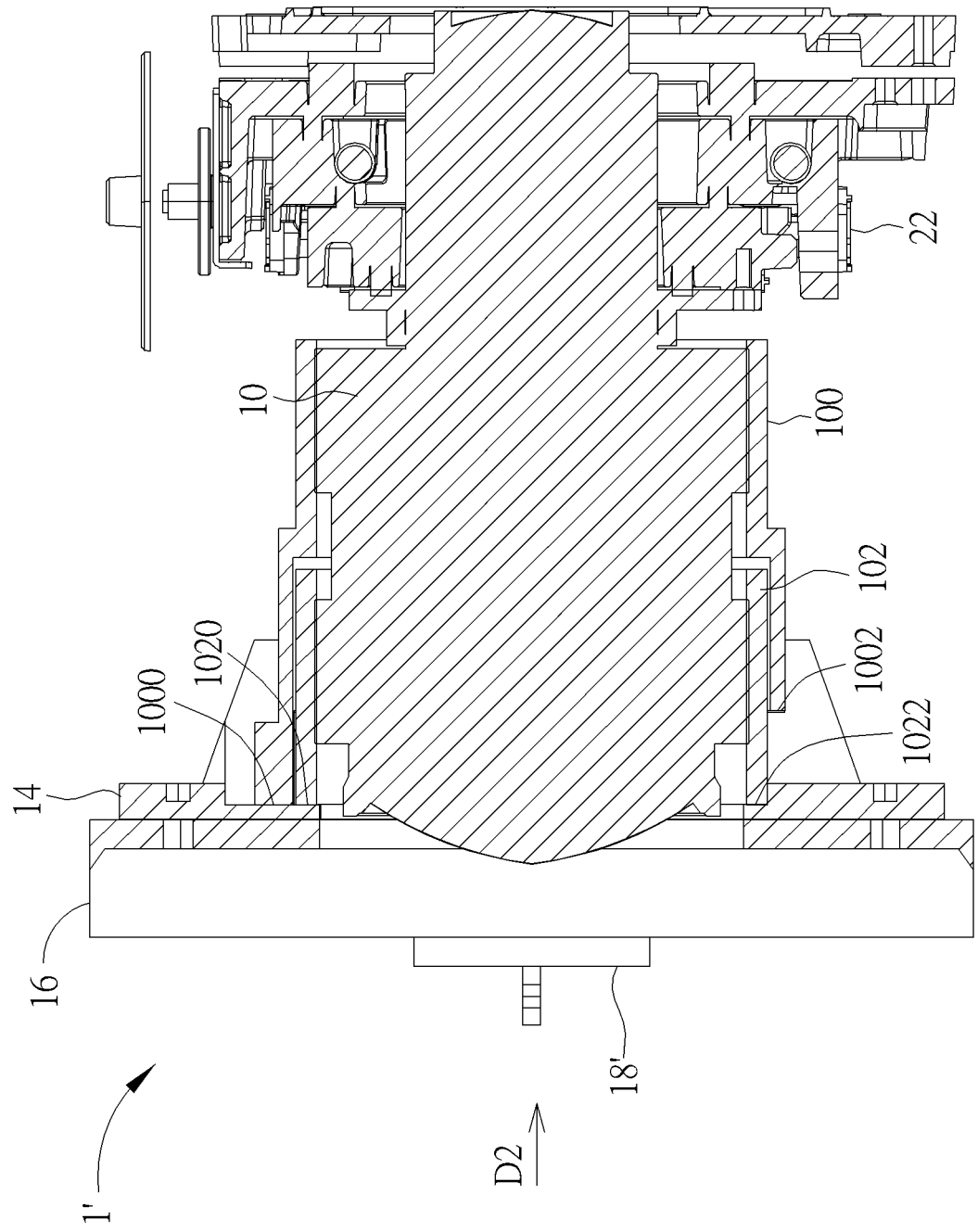
FIG. 12 is a sectional view illustrating the components shown in FIG. 9.

Referring to FIGS. 8 to 12, FIG. 8 is a perspective view illustrating a projector 1' according to another embodiment of the invention, FIG. 9 is a perspective view illustrating internal components of the projector 1' shown in FIG. 8, FIG. 10 is an exploded view illustrating the components shown in FIG. 9, FIG. 11 is a sectional view illustrating the projector 1' along line Y-Y shown in FIG. 8, and FIG. 12 is a sectional view illustrating the components along line Z-Z shown in FIG. 9.

The main difference between the projector 1' and the aforesaid projector 1 is that the first base 12' of the projector 1' is the casing of the projector 1' and the projector 1' does not comprise the individual first base 12 mentioned in the above, as shown in FIGS. 8 to 12. In this embodiment, the lock member 14 abuts against the adjusting members 100, 102 towards the axial direction D2 of the lens 10. As shown in FIG. 12, the lock member 14 may abut against a plurality of contact surfaces 1000, 1002, 1020, 1022 of the adjusting members 100, 102 towards the axial direction D2 of the lens 10 and the contact surfaces 1000, 1002, 1020, 1022 are coplanar or non-coplanar. In this embodiment, the contact surface 1000 of the adjusting member 100 and the contact surface 1020 of the adjusting member 102 are coplanar, and the contact surface 1002 of the adjusting member 100 and the contact surface 1022 of the adjusting member 102 are non-coplanar.

As shown in FIG. 11, the first base 12' of the projector 1' may have a plurality of threaded holes 124 and the first fixing member 18' of the projector 1' may be a screw. Thus, the first fixing member 18' may pass through the opening 160 of the second base 16 and be fixed to the threaded hole 124 of the first base 12', so as to fix the second base 16 to the first base 12'. When the first fixing member 18' fixes the second base 16 to the first base 12', the second base 16 pushes the lock member 14 towards the axial direction D2 of the lens 10, such that the lock member 14 forces the adjusting members 100, 102 on the lens 10 tightly towards the axial direction D2 of the lens 10. Thus, the adjusting members 100, 102 will not shift due to hit or vibration, such that the projection setting (i.e. size and/or focus of projected image) will not change. At the same time, since the first base 12' is the casing of the projector 1', the lens 10 is also fixed by the first base 12', the second base 16 and the first fixing member 18'. Accordingly, the lens 10 will not shift due to hit or vibration, such that the projection setting (i.e. position of projected image) will not change.

Compared to the aforesaid projector 1, the projector 1' may use the first base 12', the second base 16 and the first fixing member 18' to fix the adjusting members 100, 102 and the lens 10 simultaneously so that it is very convenient for the user.

Figure 13:
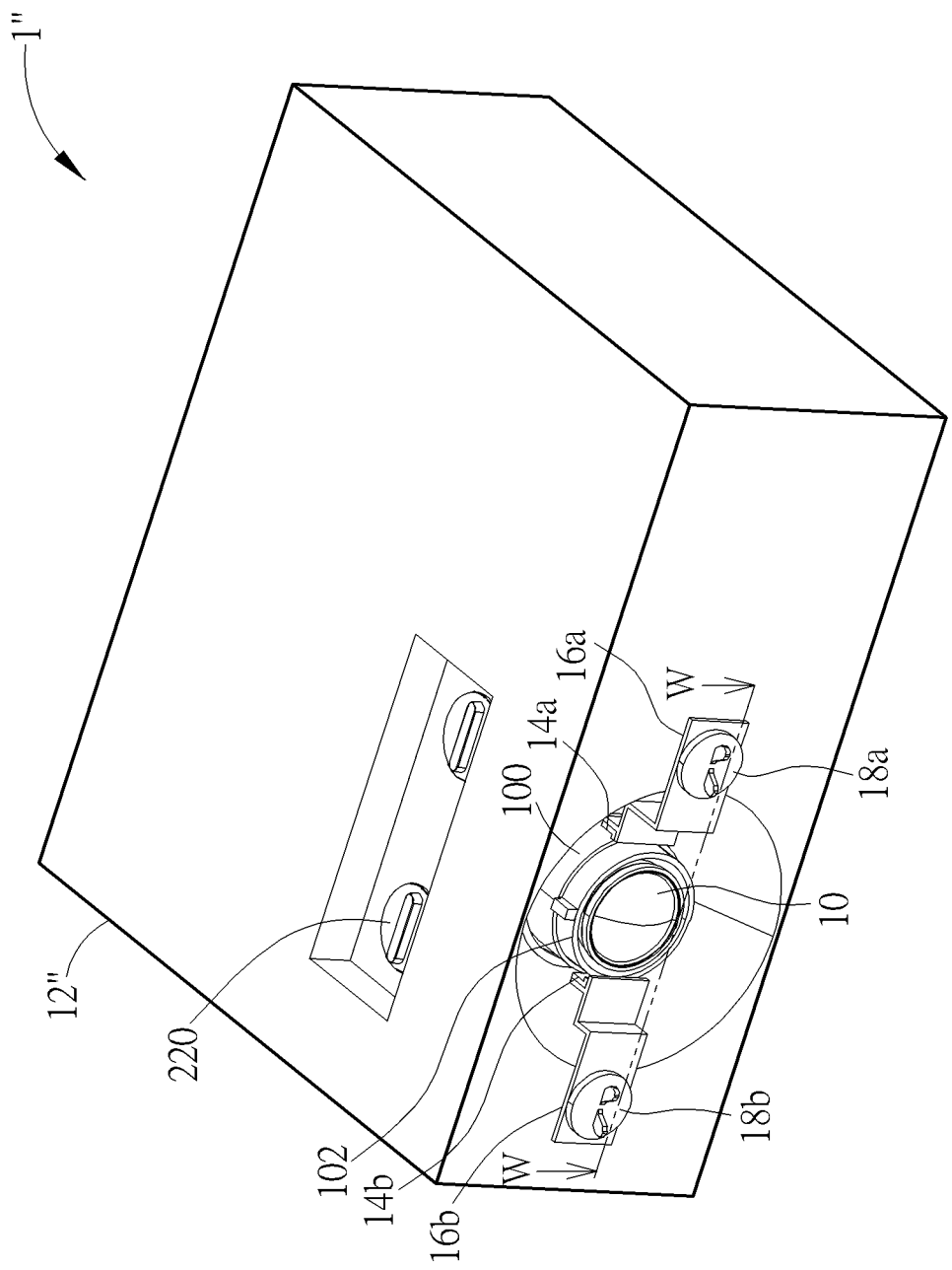
FIG. 13 is a perspective view illustrating a projector according to another embodiment of the invention.
Figure 14:
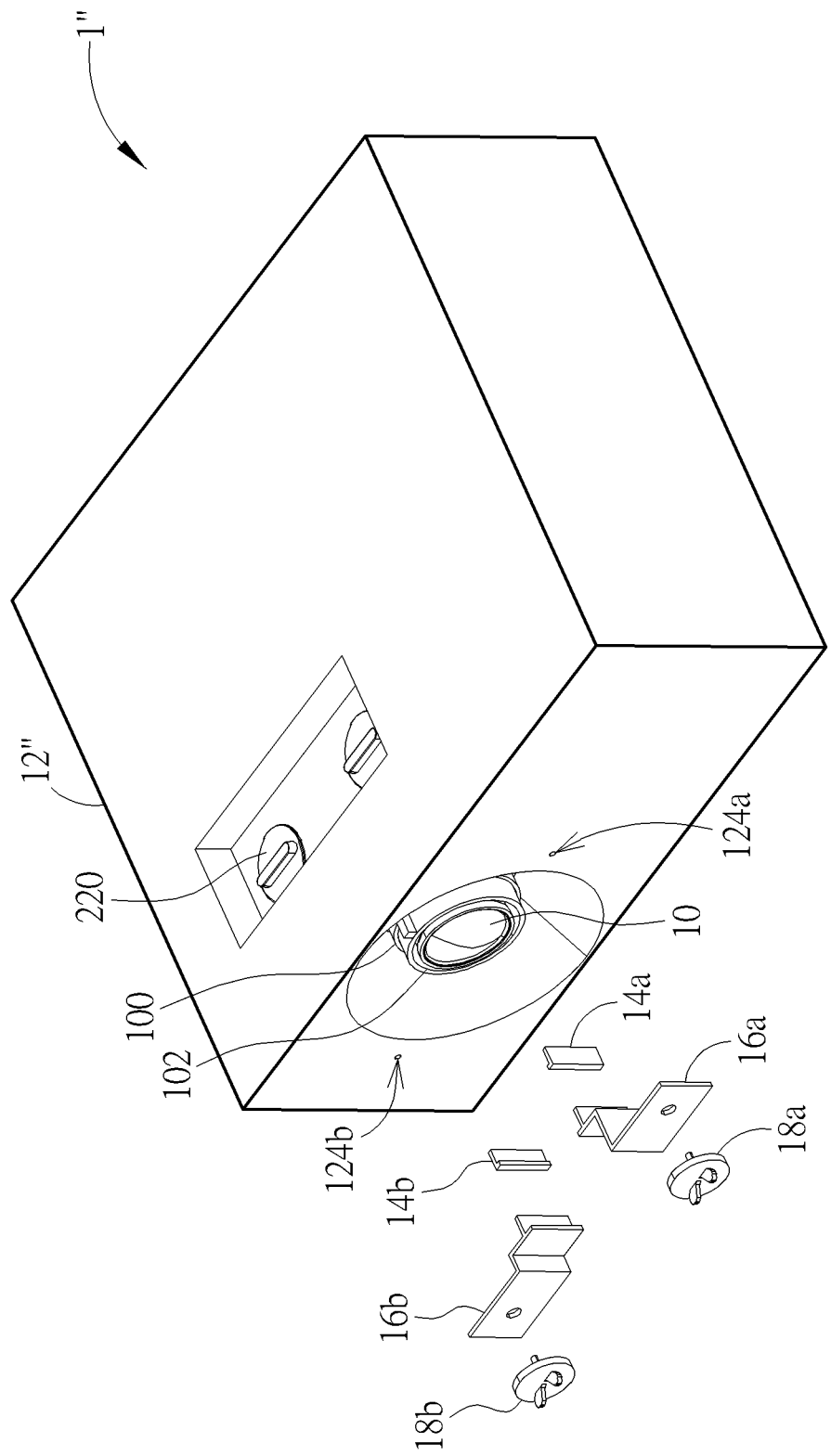
FIG. 14 is a partial exploded view illustrating the projector shown in FIG. 13.
Figure 15:
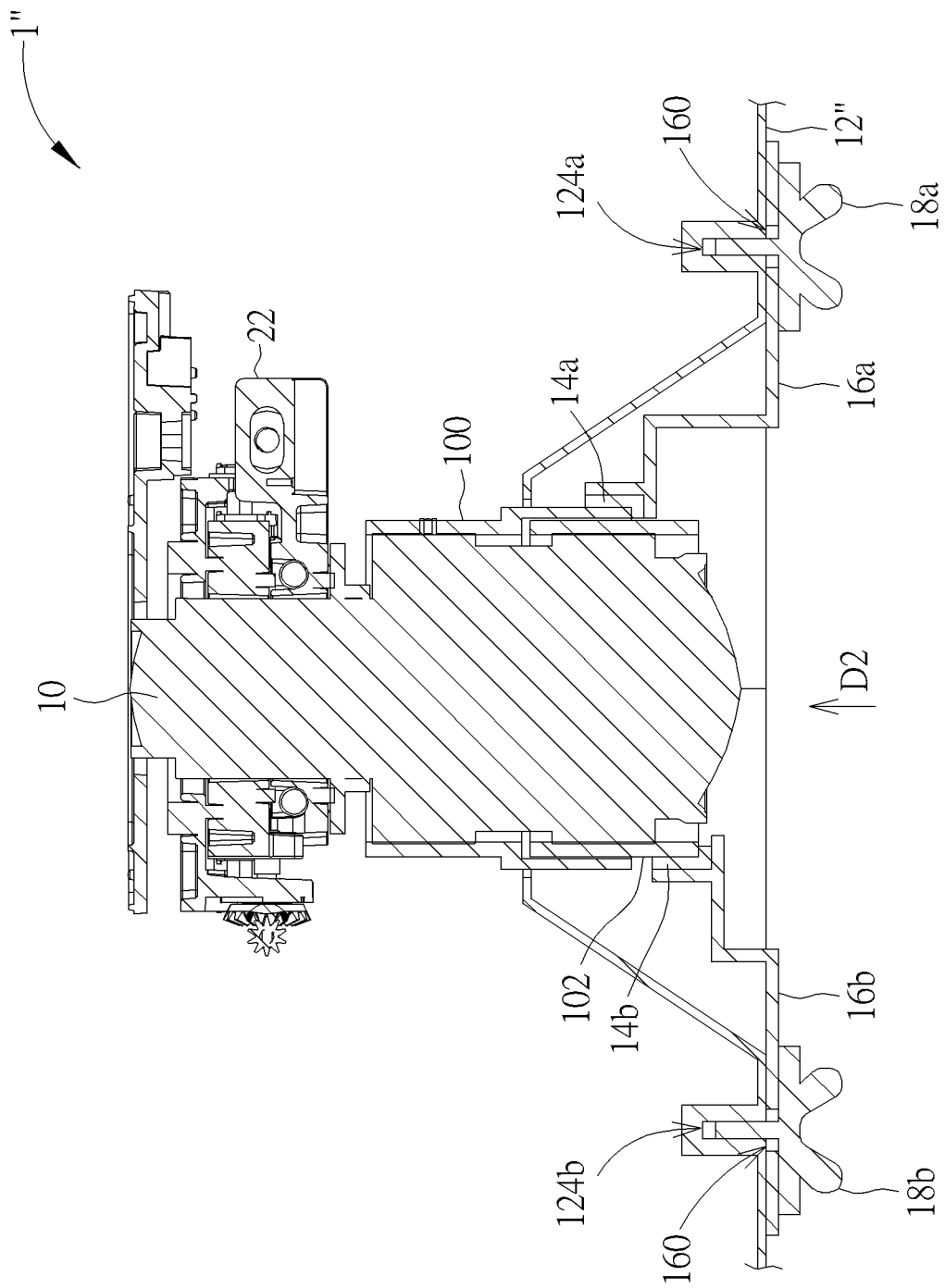
FIG. 15 is a sectional view illustrating the projector shown in FIG. 13.

Referring to FIGS. 13 to 15, FIG. 13 is a perspective view illustrating a projector 1" according to another embodiment of the invention, FIG. 14 is a partial exploded view illustrating the projector 1' shown in FIG. 13, and FIG. 15 is a sectional view illustrating the projector 1" along line W-W shown in FIG. 13.

The main difference between the projector 1' and the aforesaid projector 1' is that the projector 1" comprises a plurality of lock members 14a, 14b, a plurality of second bases 16a, 16b and a plurality of first fixing members 18a, 18b, as shown in FIGS. 13 to 15. It should be noted that the first base 12" of the projector 1" is still the casing of the projector 1". Furthermore, the number of the lock members, the second bases and the first fixing members may be determined according to practical applications. In this embodiment, the lock members 14a, 14b, the second bases 16a, 16b and the first fixing members 18a, 18b cooperate with each other to force the adjusting members 100, 102 on the lens 10, respectively. In this embodiment, the lock members 14a, 14b may be, but not limited to, L-shaped.

As shown in FIG. 15, the first base 12" of the projector 1" may have a plurality of threaded holes 124a, 124b and the first fixing members 18a, 18b of the projector 1' may be screws. After disposing the lock member 14a and the second base 16a on the adjusting member 100 sequentially, the first fixing member 18a may pass through the opening 126 of the second base 16a and be fixed to the threaded hole 124a of the first base 12", so as to fix the second base 16a to the first base 12". When the first fixing member 18a fixes the second base 16a to the first base 12", the second base 16a pushes the lock member 14a towards the axial direction D2 of the lens 10, such that the lock member 14a forces the adjusting member 100 on the lens 10 tightly towards the axial direction D2 of the lens 10. Furthermore, after disposing the lock member 14b and the second base 16b on the adjusting member 102 sequentially, the first fixing member 18b may pass through the opening 126 of the second base 16b and be fixed to the threaded hole 124b of the first base 12", so as to fix the second base 16b to the first base 12". When the first fixing member 18b fixes the second base 16b to the first base 12", the second base 16b pushes the lock member 14b towards the axial direction D2 of the lens 10, such that the lock member 14b forces the adjusting member 102 on the lens 10 tightly towards the axial direction D2 of the lens 10. Thus, the adjusting members 100, 102 will not shift due to hit or vibration, such that the projection setting (i.e. size and/or focus of projected image) will not change. Still further, since the first base 12" is the casing of the projector 1", the lens 10 is also fixed by the first base 12", the second bases 16a, 16b and the first fixing members 18a, 18b. Accordingly, the lens 10 will not shift due to hit or vibration, such that the projection setting (i.e. position of projected image) will not change.

Compared to the aforesaid projector 1', the adjusting members 100, 102 of the projector 1" may be fixed by the corresponding lock members, second bases and first fixing members, respectively, such that the adjusting members 100, 102 does not need to be fixed at the same time.

Figure 16:
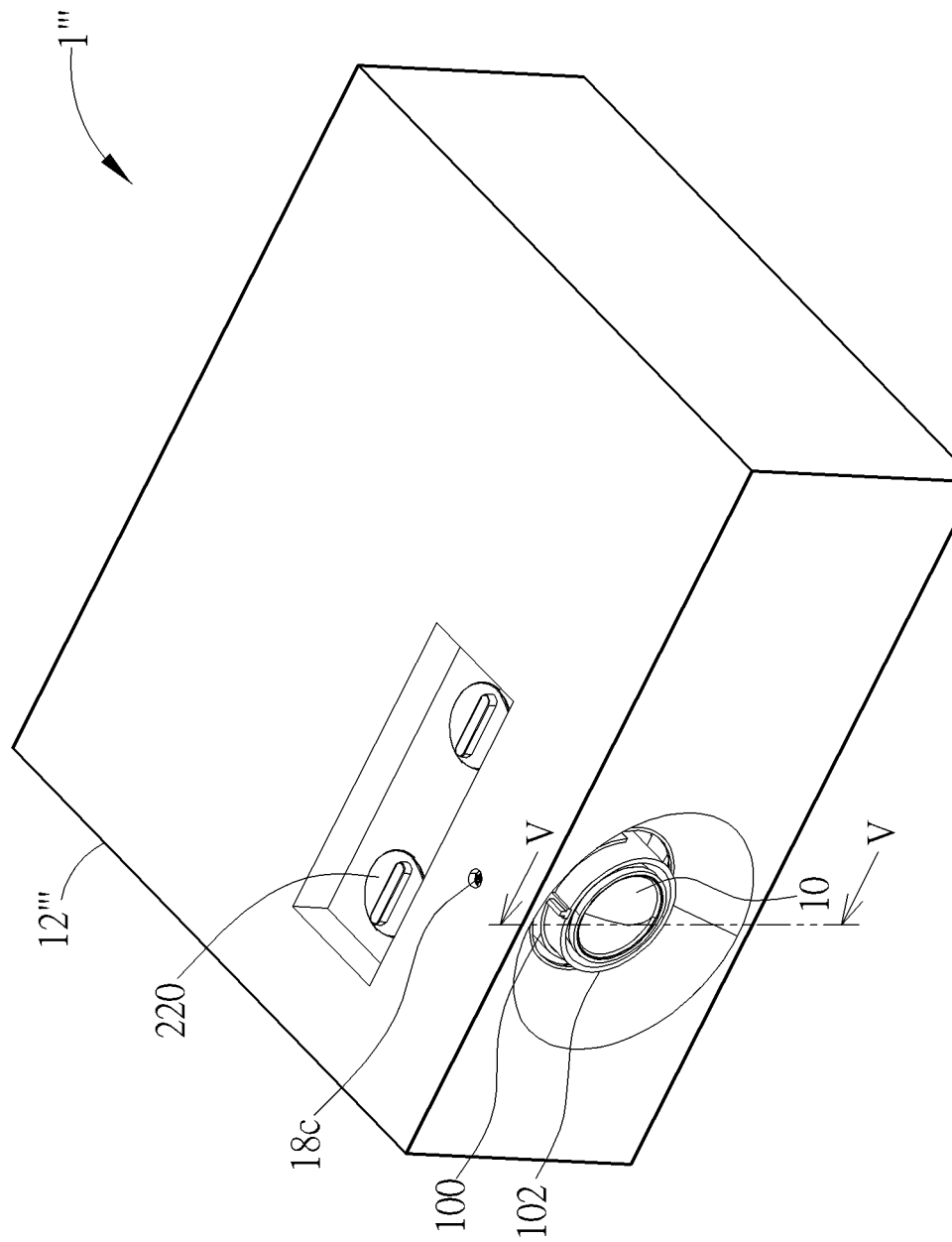
FIG. 16 is a perspective view illustrating a projector according to another embodiment of the invention.
Figure 17:
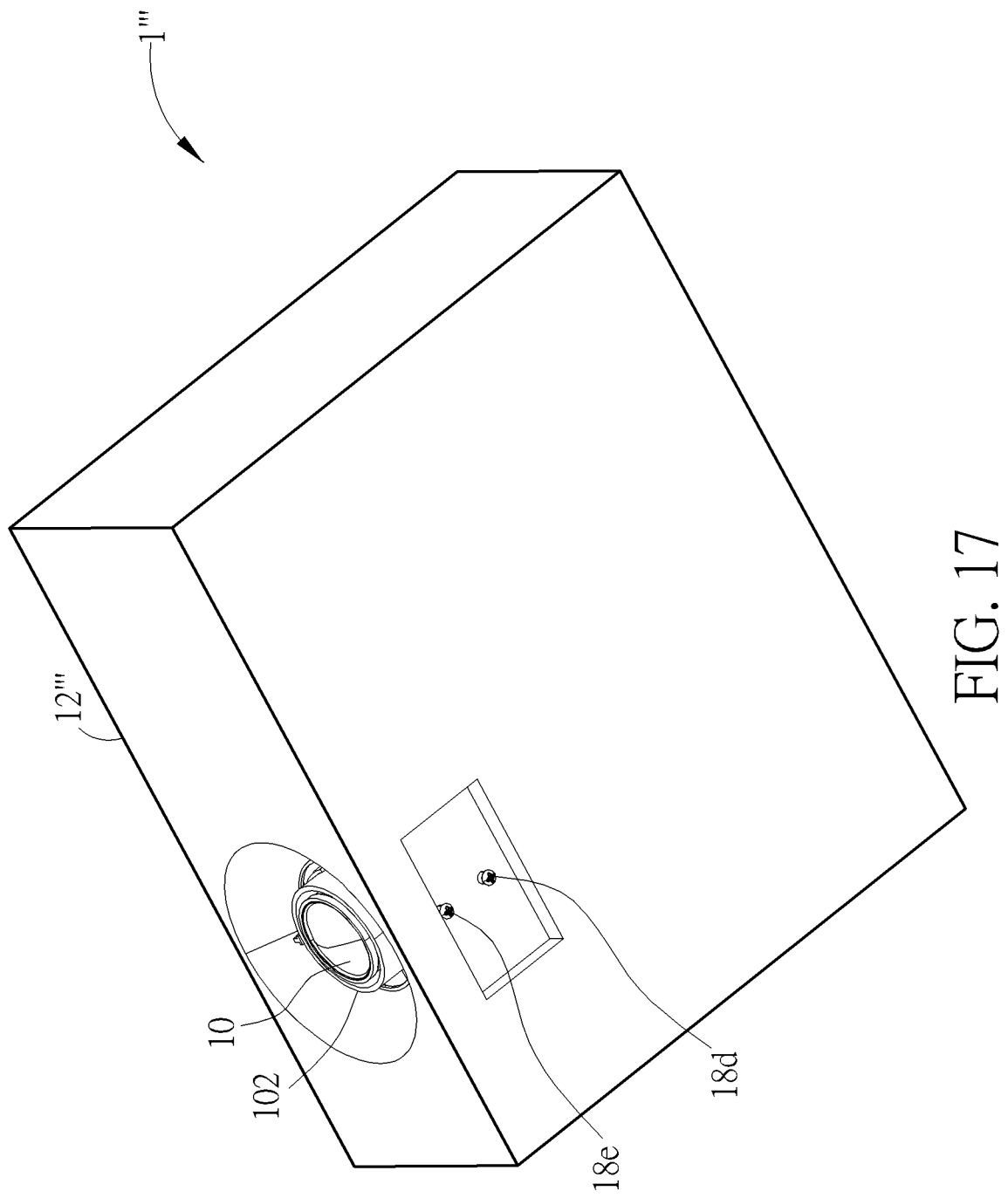
FIG. 17 is a perspective view illustrating the projector shown in FIG. 16 from another viewing angle.
Figure 18:
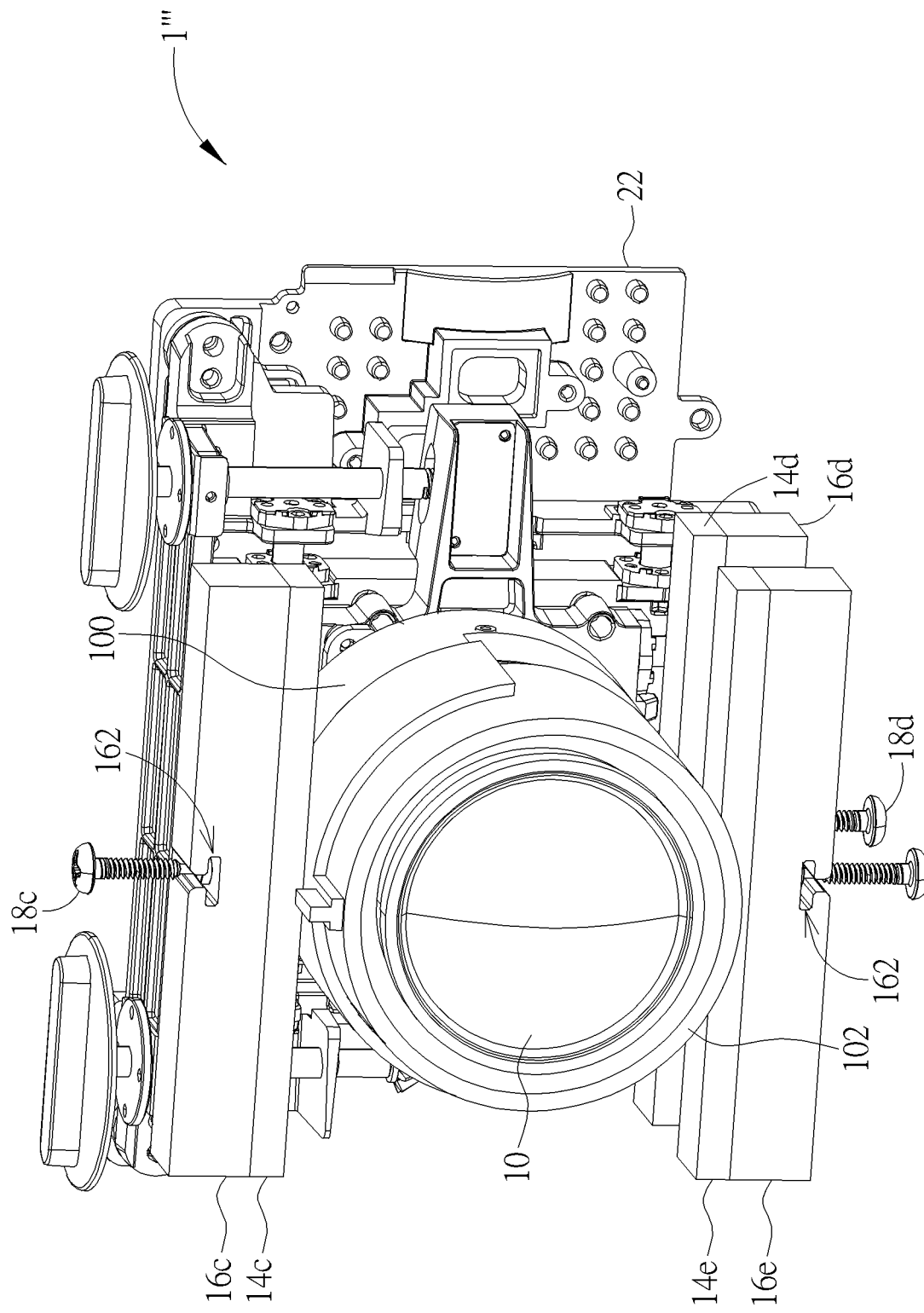
FIG. 18 is a perspective view illustrating internal components of the projector shown in FIG. 16.
Figure 19:
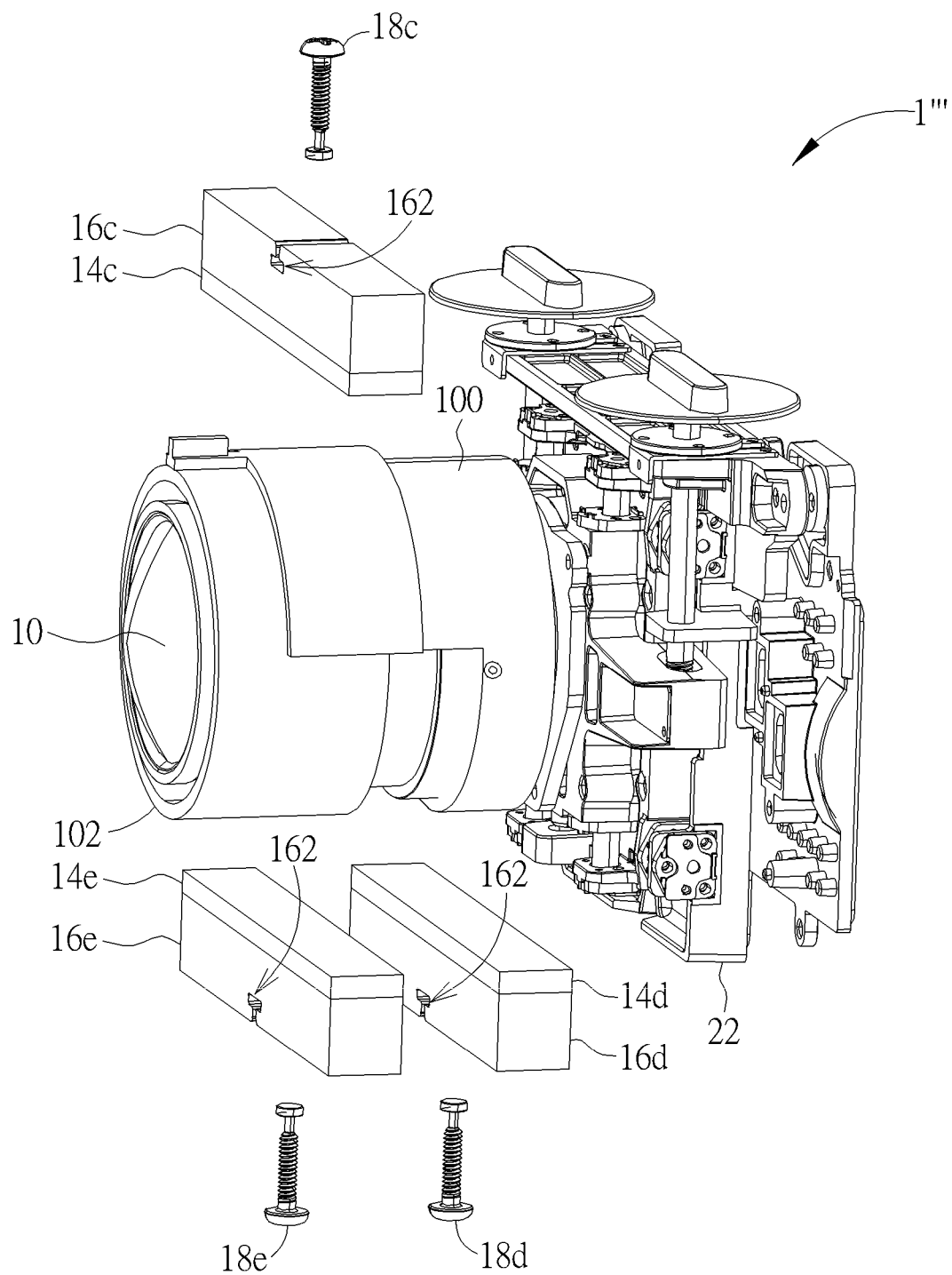
FIG. 19 is an exploded view illustrating the components shown in FIG. 18.

Referring to FIGS. 16 to 20, FIG. 16 is a perspective view illustrating a projector 1''' according to another embodiment of the invention, FIG. 17 is a perspective view illustrating the projector 1''' shown in FIG. 16 from another viewing angle, FIG. 18 is a perspective view illustrating internal components of the projector 1''' shown in FIG. 16, FIG. 19 is an exploded view illustrating the components shown in FIG. 18, and FIG. 20 is a sectional view illustrating the projector 1''' along line V-V shown in FIG. 16.

The main difference between the projector 1'" and the aforesaid projectors 1, 1', 1" is that the first fixing member of the projector 1'" fixes the second base to the first base towards the radial direction of the lens. As shown in FIGS. 16 to 20, the projector 1'" comprises a plurality of lock members 14c-14e, a plurality of second bases 16c-16e and a plurality of first fixing members 18c-18e. It should be noted that the first base 12'" of the projector 1'" is still the casing of the projector 1'". Furthermore, the number of the lock members, the second bases and the first fixing members may be determined according to practical applications. In this embodiment, the lock members 14c-14e, the second bases 16c-16e and the first fixing members 18c-18e cooperate with each other to force the adjusting members 100, 102 on the lens 10, respectively.

As shown in FIG. 20, the top and bottom sides of the first base 12'" of the projector 1'" may have a plurality of threaded holes 124c-124e and the first fixing members 18c-18e of the projector 1'" may be screws. The first fixing members 18c-18e may be fixed to the threaded holes 124c-124e, respectively, and exposed from the first base 12'". In this embodiment, each second base 16c-16e may have an engaging groove 162m such that one end of each first fixing member 18c-18e may engage with the engaging groove 162 of each second base 16c-16e. In this embodiment, the lock members 14c, 14d abut against opposite sides of the adjusting member 100 towards the radial direction D1 of the lens 10 and the second bases 16c, 16d abut against the lock members 14c, 14d, respectively. Furthermore, the lock member 14e abuts against one side of the adjusting member 102 towards the radial direction D1 of the lens 10 and the second base 16e abuts against the lock member 14e.

When the first fixing members 18c-18e are fixed tightly towards the radial direction D1 of the lens 10, the first fixing members 18c-18e fix the second bases 16c-16e to the first base 12'" towards the radial direction D1 of the lens 10. At the same time, the second bases 16c-16e push the lock members 14c-14e towards the radial direction D1 of the lens 10, such that the lock members 14c-14e force the adjusting members 100, 102 on the lens 10 tightly towards the radial direction D1 of the lens 10. Thus, the adjusting members 100, 102 will not shift due to hit or vibration, such that the projection setting (i.e. size and/or focus of projected image) will not change. Still further, since the first base 12'" is the casing of the projector 1'", the lens 10 is also fixed by the first base 12'", the second bases 16c-16e and the first fixing members 18c-18e. Accordingly, the lens 10 will not shift due to hit or vibration, such that the projection setting (i.e. position of projected image) will not change. Moreover, since the first fixing members 18c-18e exert force on the lens 10 from opposite sides of the lens 10, the force may be exerted on the lens 10 uniformly. In another embodiment, for the adjusting member 100, the invention may omit the lock member 14c, the second base 16c and the first fixing member 18c or omit the lock member 14d, the second base 16d and the first fixing member 18d according to practical applications.

In the aforesaid embodiments, the lock member may be an elastic body, such as rubber, foam, sponge or other elastic components according to practical applications.

As mentioned in the above, the invention forces the adjusting member (e.g. zoom adjusting ring and/or focus adjusting ring) on the lens tightly by the cooperation between the first base, the lock member, the second base and the first fixing member. Thus, the adjusting member will not shift due to hit or vibration, such that the projection setting (i.e. size and/or focus of projected image) will not change. Furthermore, when the projector is equipped with the displacement adjusting mechanism for the lens, the invention may further use the second fixing member to fix the second base to the casing. In another embodiment, when the first base is the casing of the projector, the invention may force the adjusting member on the lens tightly and fix the lens at the same time by the cooperation between the first base, the lock member, the second base and the first fixing member. Accordingly, the lens will not shift due to hit or vibration, such that the projection setting (i.e. position of projected image) will not change.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projector comprising:
   a lens comprising at least one adjusting member;
   a first base disposed with respect to the lens;
   a lock member abutting against the at least one adjusting member towards an axial direction of the lens;
   a second base disposed with respect to the lock member; and
   a first fixing member;
   wherein when the first fixing member fixes the second base to the first base, the second base pushes the lock member towards the axial direction of the lens, such that the lock member forces the at least one adjusting member on the lens tightly towards the axial direction of the lens.

2. The projector of claim 1, wherein the first base is disposed on the lens and the lock member is sandwiched in between the first base and the second base.

3. The projector of claim 2, wherein the lock member abuts against the at least one adjusting member towards a radial direction of the lens, the first base has a first inclined surface, the lock member has a second inclined surface, and the first inclined surface is opposite to the second inclined surface; when the first fixing member fixes the second base to the first base, the second base pushes the lock member towards the first base and the second inclined surface is forced by the first inclined surface, such that the lock member forces the at least one adjusting member on the lens tightly towards the radial direction of the lens.

4. The projector of claim 1, wherein the at least one adjusting member has a first restraining structure and the lock member has a second restraining structure;
   when the lock member is disposed on the at least one adjusting member, the second restraining structure cooperates with the first restraining structure to restrain the at least one adjusting member from moving.

5. The projector of claim 1, further comprising:
   a casing, the lens being disposed in the casing;
   a displacement adjusting mechanism disposed in the casing, the lens being connected to the displacement adjusting mechanism; and
   a second fixing member fixing the second base to the casing.

6. The projector of claim 5, wherein the casing has a fixing hole, the second base has an opening, the opening is larger than the fixing hole, and the second fixing member passes through the opening and is fixed to the fixing hole to fix the second base to the casing.

7. The projector of claim 1, wherein the first base is a casing of the projector.

8. The projector of claim 1, wherein the lock member abuts against a plurality of contact surfaces of the at least one adjusting member towards the axial direction of the lens and the contact surfaces are coplanar or non-coplanar.

9. A projector comprising:
a lens comprising at least one adjusting member;
a first base disposed with respect to the lens;
a lock member disposed on the at least one adjusting member;
a second base disposed with respect to the lock member; and
a first fixing member;
wherein when the first fixing member fixes the second base to the first base, the second base pushes the lock member, such that the lock member forces the at least one adjusting member on the lens tightly;
wherein the first base is a casing of the projector, the lens comprises a plurality of adjusting members, and the projector comprises a plurality of lock members, a plurality of second bases and a plurality of first fixing members; the lock members, the second bases and the first fixing members cooperate with each other to force the adjusting members on the lens.

10. The projector of claim 1, wherein the lock member is an elastic body.

11. A projector comprising:
a lens comprising at least one adjusting member;
a first base disposed with respect to the lens;
a lock member disposed on the at least one adjusting member;
a second base disposed with respect to the lock member; and
a first fixing member;
wherein when the first fixing member fixes the second base to the first base towards a radial direction of the lens, the second base pushes the lock member towards the radial direction of the lens, such that the lock member forces the at least one adjusting member on the lens tightly towards the radial direction of the lens.

* * * * *